US006651428B2

(12) United States Patent
Takahashi et al.

(10) Patent No.: US 6,651,428 B2
(45) Date of Patent: Nov. 25, 2003

(54) HYDRAULIC DRIVE DEVICE

(75) Inventors: Kiwamu Takahashi, Shiga-ken (JP); Takashi Kanai, Kashiwa (JP); Yasutaka Tsuruga, Moriyama (JP); Kenichiro Nakatani, Shiga-ken (JP); Junya Kawamoto, Moriyama (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 82 days.

(21) Appl. No.: 10/018,575

(22) PCT Filed: May 15, 2001

(86) PCT No.: PCT/JP01/04012

§ 371 (c)(1),
(2), (4) Date: Dec. 20, 2001

(87) PCT Pub. No.: WO01/88383

PCT Pub. Date: Nov. 22, 2001

(65) Prior Publication Data

US 2003/0097836 A1 May 29, 2003

(30) Foreign Application Priority Data

May 16, 2000 (JP) ....................................... 2000-143390

(51) Int. Cl.[7] ............................................... F16D 31/02
(52) U.S. Cl. ........................................... 60/447; 60/448
(58) Field of Search .......................... 60/447, 448, 445, 60/452

(56) References Cited

U.S. PATENT DOCUMENTS 5,317,871 A 6/1994 Ito et al.
5,579,642 A * 12/1996 Wilke et al. .................. 91/446
5,630,317 A 5/1997 Takamura et al.
5,937,645 A * 8/1999 Hamamoto .................. 91/446
6,105,367 A 8/2000 Tsuruga et al.

FOREIGN PATENT DOCUMENTS

| | | |
|---|---|---|
| JP | 2-164941 | 6/1990 |
| JP | 2-261902 | 10/1990 |
| JP | 5-99126 | 4/1993 |
| JP | 8-74805 | 3/1996 |
| JP | 10-196604 | 7/1998 |
| WO | WO92/06305 | 4/1992 |
| WO | WO94/23213 | 10/1994 |
| WO | WO98/22716 | 5/1998 |

* cited by examiner

*Primary Examiner*—Edward K. Look
*Assistant Examiner*—Igor Kershteyn
(74) *Attorney, Agent, or Firm*—Mattingly, Stanger & Malur, P.C.

(57) ABSTRACT

Differential pressures across flow control valves 6*a*, 6*b* and 6*c* are controlled by pressure compensating valves 7*a*, 7*b* and 7*c* to be held at the same value, i.e., a differential pressure ΔPLS, and the differential pressure ΔPLS is maintained at a target differential pressure ΔPLSref by a pump displacement control unit 5. For changing the target differential pressure depending on change in revolution speed of an engine 1, a flow detecting valve 31 is disposed in a delivery line 30*a*, 30*b* of a fixed displacement hydraulic pump 30, and a differential pressure ΔPp across a variable throttle portion 31*a* of the flow detecting valve 31 is introduced to a setting controller 32. A selector valve 50 operable to shift between a fully closed position and a throttle position is disposed in parallel to the flow detecting valve 31 and is shifted by a control lever 51.

6 Claims, 7 Drawing Sheets

×

↓

HYDRAULIC DRIVE DEVICE

TECHNICAL FIELD

The present invention relates to a hydraulic drive system including a variable displacement hydraulic pump, and more particularly to a hydraulic drive system in which load sensing control is performed to control the displacement of a hydraulic pump such that the difference pressure between a delivery pressure of a hydraulic pump and a maximum load pressure among a plurality of actuators is maintained at a setting value.

BACKGROUND ART

As load sensing techniques for controlling the displacement of a hydraulic pump so as to maintain the difference pressure between a delivery pressure of the hydraulic pump and a maximum load pressure among a plurality of actuators at a setting value, there are known a pump displacement control unit disclosed in JP,A 5-99126 and a hydraulic drive system disclosed in JP,A 10-196604.

The pump displacement control unit disclosed in JP,A 5-99126 comprises a servo piston for tilting a swash plate of a variable displacement hydraulic pump, and a tilting control unit for supplying a pump delivery pressure to a servo piston in accordance with a differential pressure ΔPLS between a delivery pressure Ps of a hydraulic pump and a load pressure PLS of an actuator, which is driven by the hydraulic pump, and for maintaining the differential pressure ΔPLS at a setting value ΔPLSref, thereby performing displacement control. The pump displacement control unit further comprises a fixed displacement hydraulic pump driven by an engine along with the variable displacement hydraulic pump, a throttle disposed in a delivery path of the fixed displacement hydraulic pump, and means for changing the setting value ΔPLSref in the tilting control unit in accordance with a differential pressure ΔPp across the throttle. Then, the setting value ΔPLSref of the tilting control unit is changed by detecting an engine revolution speed based on change of the differential pressure across the throttle disposed in the delivery path of the fixed displacement hydraulic pump.

The hydraulic drive system disclosed in JP,A 10-196604 is constructed by providing, in a hydraulic circuit disclosed in JP,A 5-99126, a plurality of pressure compensating valves for controlling differential pressures across a plurality of flow control valves to be held at the same differential pressure between a pump delivery pressure and a maximum load pressure, and by forming the throttle disposed in the delivery path of the fixed displacement hydraulic pump as a variable throttle that has a larger opening area when an engine revolution speed is in a range nearer to a rated revolution speed than when it is in a range nearer to a minimum revolution speed. With such an arrangement, when the engine revolution speed is set to a lower value, a target compensated differential pressure for each of the pressure compensating valves is reduced to a larger extent. As a result, actuator speed is slowed down and good fine operability can be achieved.

DISCLOSURE OF THE INVENTION

In the prior art, as described above, a fixed throttle or a flow detecting valve (variable throttle) is disposed in the delivery path of the fixed displacement hydraulic pump, and the setting value ΔPLSref in the load sensing control is changed in accordance with the differential pressure across either throttle. The setting value ΔPLSref is thereby reduced depending on the engine revolution speed so as to slow down the actuator speed.

The above-described prior art, however, has a problem in that when a speed change width required for an actuator is large, the prior art is not adaptable for such a requirement.

For example, excavation-and-loading work is one of ordinary work carried out by a hydraulic excavator. In that work, after excavation, scooped earth and sand are released and loaded on a track bed by raising a boom while a swing body is driven to swing. Also, crane work has recently been carried out using a hydraulic excavator in many cases. In the crane work, a load is hung at a fore end of a front operating mechanism and is slowly swung. The swing speed required in the excavation-and-loading work differs greatly from that required in the crane work. When one hydraulic excavator is employed to carry out both the excavation-and-loading work and the crane work, a change width of the swing speed exceeds the range obtainable in the above-described prior art through adjustment of the engine revolution speed, and the above-described prior art is not adaptable for such a large change width of the demanded actuator speed.

Even if using an electric motor as a prime mover can provide a sufficiently large width in adjustment of the revolution speed through inverter control and make a system adaptable for a large change width of the demanded actuator speed, an operator feels somewhat different from the operation of a conventional system in setting the revolution speed of the prime mover for adjustment of the actuator speed.

More specifically, when an operator reduces the revolution speed of the prime mover for fine operation in ordinary excavation work, the revolution speed of the prime mover must be adjusted while paying attention to such a point that the actuator speed will not slow down to a level unsuitable for carrying out ordinary excavation work. This imposes an excessive burden on the operator.

An object of the present invention is to provide a hydraulic drive system in which a target differential pressure in load sensing control can be changed depending on the revolution speed of a prime mover, and even when a change width of the demanded actuator speed exceeds the range adjustable with the revolution speed of the prime mover, the system is adaptable for such a change width and can realize the respective demanded actuator speeds.

(1) To achieve the above object, according to the present invention, there is provided a hydraulic drive system comprising a prime mover; a variable displacement hydraulic pump driven by the prime mover; a plurality of actuators driven by a hydraulic fluid delivered from the hydraulic pump; a plurality of flow control valves for controlling flow rates of the hydraulic fluid supplied from the hydraulic pump to the plurality of actuators; a plurality of pressure compensating valves for controlling differential pressures across the plurality of flow control valves depending on a differential pressure between a delivery rate of the hydraulic pump and a maximum load pressure among the plurality of actuators; pump displacement control means for controlling a displacement of the hydraulic pump and maintaining the differential pressure between the delivery rate of the hydraulic pump and the maximum load pressure among the plurality of actuators at a setting value; and a fixed displacement hydraulic pump driven by the prime mover along with the variable displacement hydraulic pump; the pump displacement control means including throttle means provided in a delivery line of the fixed displacement hydraulic pump, detecting change in revolution speed of the prime mover based on change in differential pressure across the throttle means, and changing the setting value depending on the revolution speed of the prime mover; wherein the hydraulic drive system further comprises a selector valve connected to the throttle means in parallel and being operable to shift between a fully closed position and a throttle position.

With the provision of the selector valve in parallel to the throttle means, when the selector valve is in the fully closed position, the throttle means functions solely and the setting value in pump displacement control (target differential pressure in load sensing control) can be adjusted depending on the revolution speed of the prime mover in the same manner as that conventionally performed. When the selector valve is shifted to the throttle position, the hydraulic fluid from the fixed displacement hydraulic pump is distributed to the throttle means and the selector valve, whereupon the flow rate of the hydraulic fluid passing through the throttle means is reduced and the differential pressure across the throttle means is also reduced. As a result, even at the same revolution speed of the prime mover, the setting value becomes smaller than that resulting when the selector valve is in the fully closed position. This reduces the differential pressure across the flow control valve controlled by the pressure compensating valve. Hence, the flow rate of the hydraulic fluid supplied to the actuator is reduced and the actuator speed is slowed down.

Thus, the target differential pressure in the load sensing control can be changed depending on the revolution speed of the prime mover. Also, even when a change width of the demanded actuator speed exceeds the range adjustable with the revolution speed of the prime mover, the system is adaptable for such a large change width and can realize the respective demanded actuator speeds.

(2) In above (1), preferably, the hydraulic drive system further comprises manual operating means for shifting the selector valve between the fully closed position and the throttle position.

With that feature, it is possible to shift the selector valve and change the actuator speed in accordance with the operator's intention.

(3) In above (1), preferably, the hydraulic drive system further comprises manual operating means operated by an operator; and switching means for shifting the selector valve between the fully closed position and the throttle position in response to an operation of the manual operating means.

That feature also makes it possible to shift the selector valve and change the actuator speed in accordance with the operator's intention.

(4) In above (3), preferably, the switching means are electrically and hydraulically operated.

With that feature, the selector valve can be shifted in a hydraulic way.

(5) In above (3), the switching means may be electrically operated.

With that feature, the selector valve can be shifted in an electrical way.

(6) Further, in above (1), the selector valve is able to change an opening area continuously when the selector valve is in the throttle position.

With that feature, the actuator speed can be freely adjusted in accordance with the operator's preference.

BEST MODE FOR CARRYING OUT THE INVENTION

Embodiments of the present invention will be described below with reference to the drawings.

A first embodiment of the present invention will be first described with reference to FIGS. 1 to 5.

Figure 1:
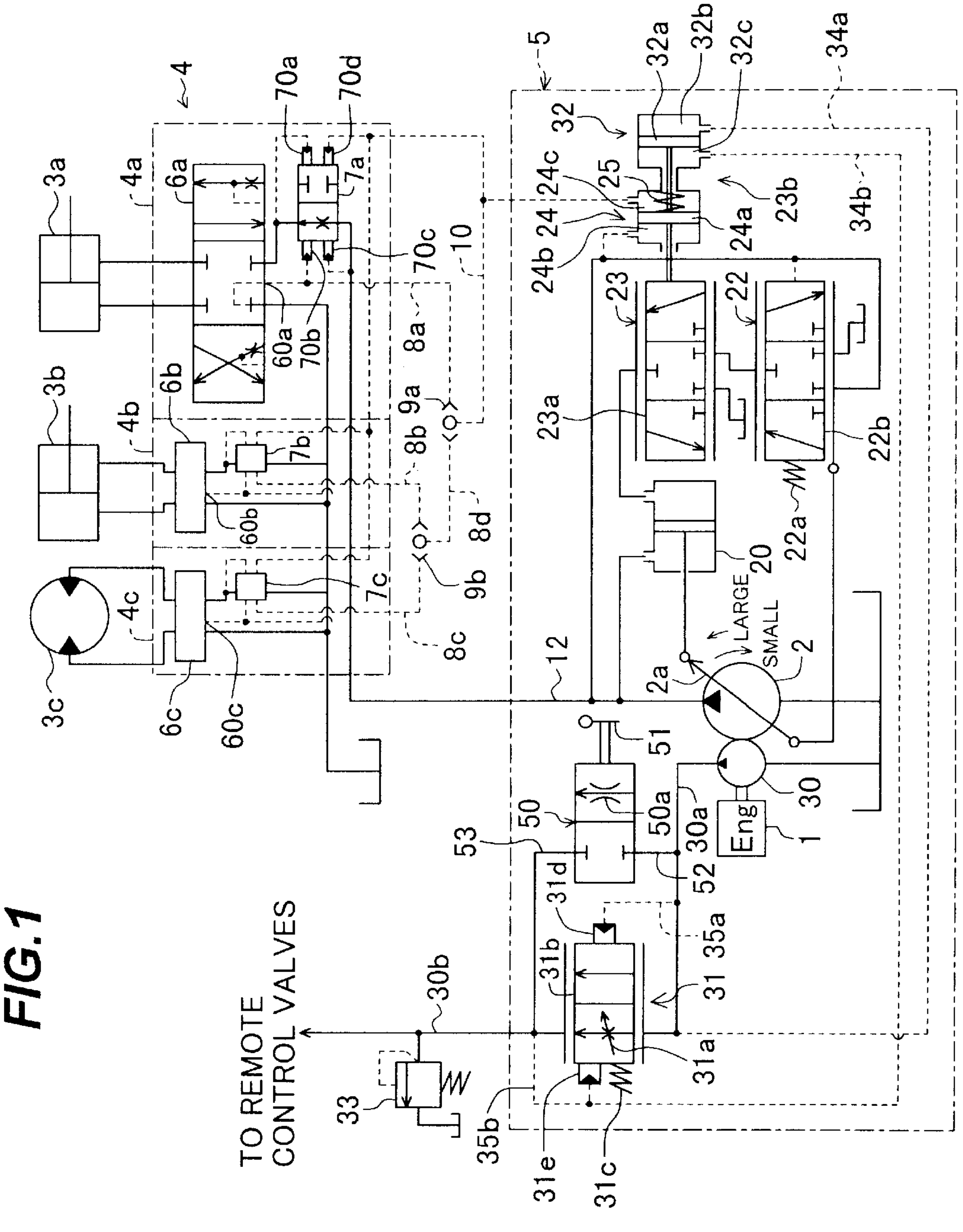
FIG. 1 is a hydraulic circuit diagram showing a construction of a hydraulic drive system according to a first embodiment of the present invention.

In FIG. 1, a hydraulic drive system according to the fifth embodiment of the present invention comprises a prime mover, e.g., an engine 1; a variable displacement hydraulic pump 2 driven by the engine 1; a plurality of actuators 3*a*, 3*b* and 3*c* driven by a hydraulic fluid delivered from the hydraulic pump 2; a valve unit 4 comprising a plurality of valve sections 4*a*, 4*b* and 4*c* which are connected to a delivery line 12 of the hydraulic pump 2 and which control respective flow rates and directions at and in which the hydraulic fluid is supplied to the actuators 3*a*, 3*b* and 3*c*; and a pump displacement control unit 5 for controlling the displacement of the hydraulic pump 2.

The plurality of valve sections 4*a*, 4*b* and 4*c* comprise respectively a plurality of flow control valves 6*a*, 6*b* and 6*c*, and a plurality of pressure compensating valves 7*a*, 7*b* and 7*c* for controlling differential pressures across the plurality of flow control valves 6*a*, 6*b* and 6*c* to be the same value.

The plurality of pressure compensating valves 7*a*, 7*b* and 7*c* are of the front-located type that they are disposed respectively upstream of the flow control valves 6*a*, 6*b* and 6*c*. The pressure compensating valve 7*a* has two pairs of control pressure chambers 70*a*, 70*b*; 70*c*, 70*d* in an opposed relation. Pressures upstream and downstream of the flow control valve 6*a* are introduced respectively to the control pressure chambers 70*a*, 70*b*, whereas a delivery pressure Ps of the hydraulic pump 2 and a maximum load pressure PLS among the plurality of actuators 3*a*, 3*b* and 3*c* are introduced respectively to control pressure chambers 70*c*, 70*d*. With such an arrangement, the differential pressure across the flow control valve 6*a* acts on the pressure compensating valve 7*a* in the valve closing direction, and a differential pressure ΔPLS between the delivery pressure Ps of the hydraulic pump 2 and the maximum load pressure PLS among the plurality of actuators 3*a*, 3*b* and 3*c* acts on the pressure compensating valve 7*a* in the valve opening direction. Therefore, the differential pressure across the flow control valve 6*a* is controlled with the differential pressure ΔPLS serving as a target differential pressure for pressure compensation. The other pressure compensating valves 7$b$, 7$c$ are constructed likewise.

Thus, since the pressure compensating valves 7$a$, 7$b$ and 7$c$ control respectively the differential pressures across the flow control valves 6$a$, 6$b$ and 6$c$ with the differential pressure ΔPLS serving as the target differential pressure, the differential pressures across the flow control valves 6$a$, 6$b$ and 6$c$ are each controlled to be held at the differential pressure ΔPLS, and demanded flow rates of the flow control valves 6$a$, 6$b$ and 6$c$ are expressed by the products of the differential pressure ΔPLS and respective opening areas.

The plurality of flow control valves 6$a$, 6$b$ and 6$c$ have load ports 60$a$, 60$b$ and 60$c$ for taking out respective load pressures of the actuators 3$a$, 3$b$ and 3$c$ during operations thereof. A maximum one of the load pressures taken out at the load ports 60$a$, 60$b$ and 60$c$ is detected by a signal line 10 through load lines 8$a$, 8$b$, 8$c$ and 8$d$, and shuttle valves 9$a$, 9$b$, and the detected pressure is supplied as the maximum load pressure PLS to the pressure compensating valves 7$a$, 7$b$ and 7$c$.

The hydraulic pump 2 is a swash plate pump of which delivery rate is increased by increasing a tilting angle of a swash plate 2$a$. The pump displacement control unit 5 comprises a servo piston 20 for tilting the swash plate 2$a$ of the hydraulic pump 2, and a first tilting control valve 22 and a second tilting control valve 23 for controlling the operation of the servo piston 20. The servo piston 20 is operated in accordance with the pressure supplied from the delivery line 12 (the delivery pressure Ps of the hydraulic pump 2) and a command pressure from the tilting control valves 22, 23, and controls the tilting angle of the swash plate 2$a$ for displacement control of the hydraulic pump 2.

The first tilting control valve 22 is a horsepower control valve for reducing the delivery rate of the hydraulic pump 2 when the pressure supplied from the delivery line 12 (the delivery pressure Ps of the hydraulic pump 2) increases. The first tilting control valve 22 receives the delivery pressure Ps of the hydraulic pump 2 as a source pressure, and a spool 22$b$ is moved to the right in the drawing when the delivery pressure Ps of the hydraulic pump 2 is not higher than a predetermined level set by a spring 22$a$, whereupon the delivery pressure Ps of the hydraulic pump 2 is outputted as it is. When that output pressure of the first tilting control valve 22 is directly applied as the command pressure to the servo piston 20, the servo piston 20 is moved to the left in the drawing due to its area difference between both sides, whereupon the tilting angle of the swash plate 2$a$ is increased to increase the delivery rate of the hydraulic pump 2. As a result, the delivery pressure Ps of the hydraulic pump 2 rises. When the delivery pressure Ps of the hydraulic pump 2 exceeds the predetermined level set by the spring 22$a$, the spool 22$b$ is moved to the left in the drawing to reduce the delivery pressure Ps, and the reduced pressure is outputted as the command pressure. Therefore, the servo piston 20 is moved to the right in the drawing, whereupon the tilting angle of the swash plate 2$a$ is reduced to reduce the delivery rate of the hydraulic pump 2. As a result, the delivery pressure Ps of the hydraulic pump 2 lowers.

The second tilting control valve 23 is a load sensing control valve for controlling the differential pressure ΔPLS between the delivery pressure Ps of the hydraulic pump 2 and the maximum load pressure PLS among the plurality of actuators 3$a$, 3$b$ and 3$c$ to be maintained at the target differential pressure ΔPLSref. The second tilting control valve 23 comprises a spool 23$a$ and a setting controller 23$b$. The pressure supplied from the delivery line 12 (the delivery pressure Ps of the hydraulic pump 2) and the maximum load pressure PLS among the plurality of actuators 3$a$, 3$b$ and 3$c$ are fed back to the setting controller 23$b$. The setting controller 23$b$ comprises a first driving unit 24 for moving the spool 23$a$, and a second driving unit 32 for setting the target differential pressure ΔPLSref.

The first driving unit 24 comprises a piston 24$a$ acting on the spool 23$a$, and two hydraulic chambers 24$b$, 24$c$ divided by the piston 24$a$. The delivery pressure Ps of the hydraulic pump 2 is introduced to the hydraulic chamber 24$b$, and the maximum load pressure PLS is introduced to the hydraulic chamber 24$c$. Further, a spring 25 for pressing the piston 24$a$ against the spool 23$a$ is built in the hydraulic chamber 24$c$.

The second driving unit 32 is provided integrally with the first driving unit 24, and it comprises a piston 32$a$ acting on the piston 24$a$ of the first driving unit 24, and two hydraulic chambers 32$b$, 32$c$ divided by the piston 32$a$. Respective pressures upstream and downstream of a flow detecting valve 31 (described later) are introduced to the hydraulic chambers 32$b$, 32$c$ via pilot lines 34$a$, 34$b$. Thus, the piston 32$a$ urges the piston 24$a$ to the left in the drawing by a force corresponding to a differential pressure ΔPp across the flow detecting valve 31.

The second tilting control valve 23 having the above-described construction receives the output pressure of the first tilting control valve 22 as a source pressure. Then, when the differential pressure ΔPLS is lower than the target differential pressure ΔPLSref set by the second driving unit 32, the first driving unit 24 acts to move the spool 23$a$ to the left in the drawing, whereupon the output pressure of the first tilting control valve 22 is outputted as it is. Assuming here that the output pressure of the first tilting control valve 22 is of the delivery pressure Ps of the hydraulic pump 2, the delivery pressure Ps is applied as the command pressure to the servo piston 20. Hence, the servo piston 20 is moved to the left in the drawing due to its area difference between both sides, whereupon the tilting angle of the swash plate 2$a$ is increased to increase the delivery rate of the hydraulic pump 2. As a result, the delivery pressure Ps of the hydraulic pump 2 rises and the differential pressure ΔPLS also rises. To the contrary, when the differential pressure ΔPLS is higher than the target differential pressure ΔPLSref set by the second driving unit 32, the first driving unit 24 acts to move the spool 23$a$ to the right in the drawing, whereupon the output pressure of the first tilting control valve 22 is reduced and the reduced pressure is outputted as the command pressure. Therefore, the servo piston 20 is moved to the right in the drawing, whereupon the tilting angle of the swash plate 2$a$ is reduced to reduce the delivery rate of the hydraulic pump 2. As a result, the delivery pressure Ps of the hydraulic pump 2 lowers and the differential pressure ΔPLS also lowers. The differential pressure ΔPLS is thus maintained at the target differential pressure ΔPLSref.

Herein, since the differential pressures across the flow control valves 6$a$, 6$b$ and 6$c$ are controlled by the pressure compensating valves 7$a$, 7$b$ and 7$c$ to be held at the same value, i.e., the differential pressure ΔPLS, the differential pressures across the flow control valves 6$a$, 6$b$ and 6$c$ are maintained at the target differential pressure ΔPLSref by maintaining the differential pressure ΔPLS at the target differential pressure ΔPLSref as described above.

For enabling the target differential pressure ΔPLSref to be changed depending on the revolution speed of the engine 1, in this embodiment, the pump displacement control unit 5 further comprises a fixed displacement hydraulic pump 30 driven by the engine 1 along with the variable displacement hydraulic pump 2; the flow detecting valve 31 disposed in a delivery line 30*a*, 30*b* of the fixed displacement hydraulic pump 30 and having a variable throttle portion 31*a* which has an adjustable opening area; a selector valve 50 disposed in parallel to the flow detecting valve 31 and operated between a fully closed position and a throttle position; and a control lever 51 associated with the selector valve 50 and operating the selector valve 50 so as to shift between the fully closed position and the throttle position.

The fixed displacement hydraulic pump 30 is a pilot pump that is provided as a pilot hydraulic source in usual cases. The fixed displacement hydraulic pump 30 has a delivery line 30*b*, which is connected to a relief valve 33 for defining a source pressure serving as a pilot hydraulic source, and which is also connected to remote control valves (not shown) for producing pilot pressures to shift, e.g., the flow control valves 6*a*, 6*b* and 6*c*.

The flow detecting valve 31 is structured such that the opening area of the variable throttle portion 31*a* is changed depending on the differential pressure ΔPp across the variable throttle portion 31*a* itself. More specifically, the flow detecting valve 31 comprises a valve member 31*b*, a spring 31*c* acting on the valve member 31*b* in the direction to reduce the opening area of the variable throttle portion 31*a*, a control pressure chamber 31*d* acting on the valve member 31*b* in the direction to increase the opening area of the variable throttle portion 31*a*, and a control pressure chamber 31*e* acting on the valve member 31*b* in the direction to reduce the opening area of the variable throttle portion 31*a*. A pressure upstream of the variable throttle portion 31*a* is introduced to the control pressure chamber 31*d* via a pilot line 35*a*, and a pressure downstream of the variable throttle portion 31*a* is introduced to the control pressure chamber 31*e* via a pilot line 35*b*.

The opening area of the variable throttle portion 31*a* is defined upon balance among a resilient force of the spring 31*c* and biasing forces applied from the control pressure chambers 31*d*, 31*e*. When the differential pressure ΔPp across the variable throttle portion 31*a* reduces, the valve member 31*b* is moved to the right in the drawing to reduce the opening area of the variable throttle portion 31*a*. When the differential pressure ΔPp increases, the valve member 31*b* is moved to the left in the drawing to increase the opening area of the variable throttle portion 31*a*.

Then, the differential pressure ΔPp across the variable throttle portion 31*a* is changed depending on the revolution speed of the engine 1. In other words, as the revolution speed of the engine 1 lowers, the delivery rate of the hydraulic pump 30 is reduced and hence the differential pressure ΔPp across the variable throttle portion 31*a* is also reduced.

As described above, the respective pressures upstream and downstream of the variable throttle portion 31*a* of the flow detecting valve 31 are introduced to the control pressure chambers 32*b*, 32*c* of the second driving unit 32 via the pilot lines 34*a*, 34*b*, and the piston 32*a* of the second driving unit 32 urges the piston 24*a* to the left in the drawing by a force corresponding to the differential pressure ΔPp across the variable throttle portion 31*a* of the flow detecting valve 31. Accordingly, when the differential pressure ΔPp across the variable throttle portion 31*a* of the flow detecting valve 31 reduces, the piston 32*a* pushes the piston 24*a* by a smaller force to reduce the target differential pressure ΔPLSref, and when the differential pressure ΔPp increases, the piston 32*a* pushes the piston 24*a* by a larger force to increase the target differential pressure ΔPLSref. As a result, the target differential pressure ΔPLSref provided by the first tilting control valve 23 varies depending on the differential pressure ΔPp across the variable throttle portion 31*a* of the flow detecting valve 31, i.e., the revolution speed of the engine 1.

The selector valve 50 serves to selectively switch over, depending on its shift position, characteristics of change in the differential pressure ΔPp across the variable throttle portion 31*a* with respect to the delivery rate of the hydraulic pump 30 (in proportion to the engine revolution speed) between the ordinary work mode and the crane work mode. The selector valve 50 has an input port connected to the input port side of the flow detecting valve 31 via a bypass fluid line 52, and has an output port connected to the output port side of the flow detecting valve 31 via a bypass fluid line 53. Also, the selector valve 50 has a throttle portion 50*a* that functions as a fixed throttle when the selector valve 50 is in a throttle position.

The hydraulic drive system described above is installed in, e.g., a hydraulic excavator. In such a case, by way of example, the actuator 3*a* is a boom cylinder for driving a boom, the actuator 3*b* is an arm cylinder for driving an arm, and the actuator 3*c* is a swing motor for turning a swing body with respect to a lower travel structure.

The operation of this embodiment having the above-described construction is summarized below.

When the selector valve 50 is in the fully closed position, the system is of the same construction as the case not including the selector valve 50, i.e., as that of the pump displacement control unit disclosed in JP,A 10-196604, and all of the hydraulic fluid delivered from the fixed displacement hydraulic pump 30 passes through the flow detecting valve 31. In this case, the change in the differential pressure ΔPp across the flow detecting valve 31 (or ΔPLSref) with respect to the delivery rate of the hydraulic pump 30 (in proportion to the engine revolution speed) is given as providing characteristics suitable for the ordinary work mode.

When the control lever 51 associated with the selector valve 50 is operated and the selector valve 50 is shifted to the throttle position, a circuit arrangement is established in which a throttle circuit is added in parallel to the flow detecting valve 31. In that circuit arrangement, the hydraulic fluid delivered from the hydraulic pump 30 is distributed to a parallel throttle circuit constituted by the flow detecting valve 31 and the selector valve 50. Upon the shift of the selector valve 50 to the throttle position, therefore, the flow rate of the hydraulic fluid passing through the flow detecting valve 31 is reduced and the differential pressure ΔPp across the flow detecting valve 31 (or ΔPLSref) is also reduced. In this case, the change in the differential pressure ΔPp across the flow detecting valve 31 (or ΔPLSref) with respect to the delivery rate of the hydraulic pump 30 (in proportion to the engine revolution speed) is given as providing characteristics suitable for the crane work mode.

Stated otherwise, even at the same revolution speed of the engine 1, there occurs a reduction in the target differential pressure ΔPLSref provided by the first tilting control valve 23 and hence in the target compensated differential pressure (=ΔPLSref) for each of the pressure compensating valves 7*a*, 7*b* and 7*c*, whereby the speeds of the actuators 3*a*, 3*b* and 3*c* are slowed down. At this time, the reduction in the differential pressure ΔPp across the flow detecting valve 31 can be optionally set depending on the opening area of the throttle portion 50*a* of the selector valve 50.

The operations carried out when the selector valve 50 is in the fully closed position and in the throttle position, will be described below in more detail with reference to FIGS. 2A to 2C.

The fixed displacement hydraulic pump 30 delivers the hydraulic fluid at a flow rate Qp resulting from multiplying a revolution speed N of the engine 1 by a displacement Cm of the hydraulic pump 30.

$$Qp=CmN \tag{1}$$

Assuming that the opening area of the variable throttle portion 31*a* of the flow detecting valve 31 is Ap1, the delivery rate Qp of the fixed displacement hydraulic pump 30 or the revolution speed N of the engine 1 is correlated to the differential pressure ΔPp across the variable throttle portion 31*a* by the following formula:

$$Qp=CmN=cAP1\sqrt{}((2/\rho)\Delta Pp) \tag{2}$$

Herein, the flow detecting valve 31 is structured so as to change the opening area Ap1 of the variable throttle portion 31*a* depending on the differential pressure ΔPp across the variable throttle portion 31*a*. In such a structure, the relationship between the opening area Ap1 and the differential pressure ΔPp is set, by way of example, as follows:

$$Ap1=a\sqrt{}\Delta Pp) \tag{3}$$

By putting the formula (3) in the formula (2), the relationship between the delivery rate Qp of the fixed displacement hydraulic pump 30 and the differential pressure ΔPp across the variable throttle portion 31*a* is expressed by the following formula (4):

$$\begin{aligned}\Delta Pp &= (1/ca)\sqrt{}(\rho/2)\cdot Qp \\ &= (Cm/ca)\sqrt{}(\rho/2)\cdot N\end{aligned} \tag{4}$$

Also, assuming that the pressing force of the spring 25 in the second driving unit 32 is k when calculated in terms of pressure, ΔPLSref=ΔPp+k is resulted and hence ΔPLSref∝ΔPp is resulted. Further, assuming the pressing force of the spring 25 to be negligible, ΔPLSref=ΔPp is resulted. Accordingly, the formula (4) can be expressed as follows:

$$\Delta PLS\text{ref}\propto(\text{or}=)\Delta Pp\propto Qp$$

$$\Delta PLS\text{ref}\propto(\text{or}=)\Delta Pp\propto N \tag{5}$$

Figure 2A:
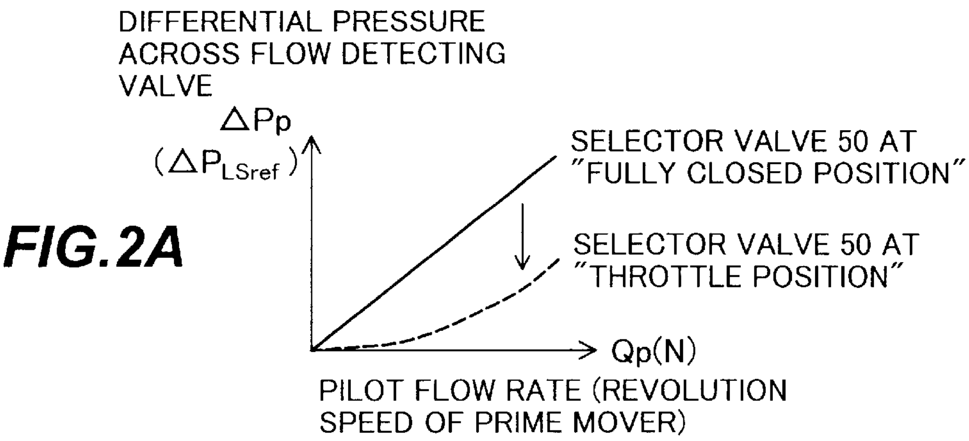
FIGS. 2A, 2B and 2C are characteristic graphs for explaining the operations of a flow detecting valve and a selector valve in the first embodiment.

In other words, the differential pressure ΔPp or ΔPLSref increases linearly with respect to the delivery rate Qp of the hydraulic pump 30 or the revolution speed N of the engine 1, as indicated by a solid line in FIG. 2A.

Further, when the differential pressure ΔPLS across one, e.g., 6*a*, of the flow control valves 6*a*, 6*b* and 6*c* is controlled to ΔPLSref by the pressure compensating valve 7*a*, a flow rate Qv demanded by the flow control valve 6*a* is given below on an assumption that the opening area of the flow control valve 6*a* is Av:

$$Qv=cAv\sqrt{}((2/\rho)\Delta PLS\text{ref}) \tag{6}$$

Figure 2B:
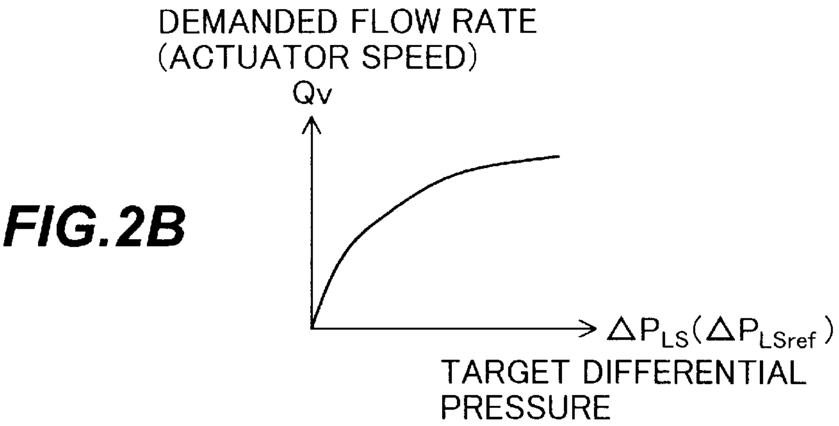

In other words, the demanded flow rate Qv increases along an upwardly-convex parabolic curve with respect to the target differential pressure ΔPLSref, as shown in FIG. 2B.

From the formulae (4) to (6), the demanded flow rate Qv can be correlated to the revolution speed N of the engine 1 as expressed below:

$$Qv\propto cAv\sqrt{}((Cm/ca)(2/\rho)^{1/2})\cdot\sqrt{}N \tag{7}$$

Therefore:

$$Qv\propto N^{1/2} \tag{8}$$

Figure 2C:
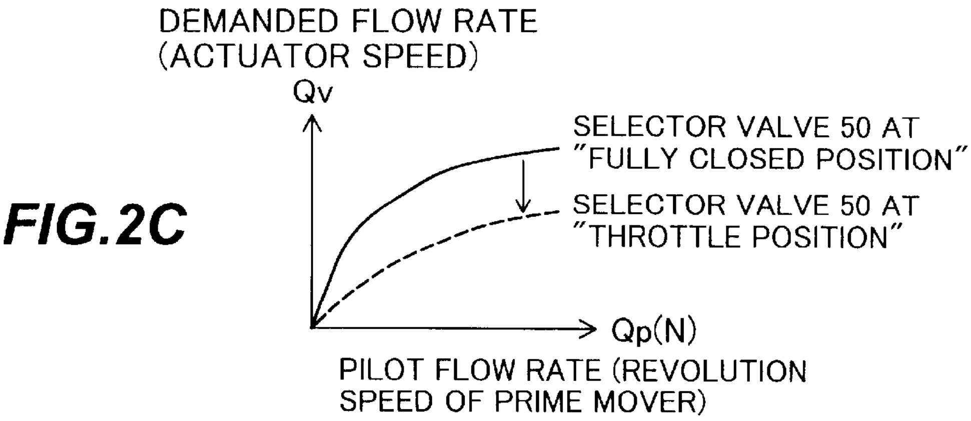

Thus, as a result of the combination of the linearly proportional relationship (formula (4)) between the flow rate Qp and the differential pressure ΔPp, indicated by the solid line in FIG. 2A, and the relationship (formula (6)) represented by an upwardly-convex parabolic curve between the differential pressure ΔPLS and the demanded flow rate Qv, shown in FIG. 2B, the demanded flow rate Qv increases along an upwardly-convex parabolic curve with respect to the revolution speed N of the engine 1, as indicated by a solid line in FIG. 2C.

Next, a description is made of the operation carried out when the selector valve 50 is shifted to the throttle position.

Assuming that the flow rates of the hydraulic fluid are Q1, Q2, respectively, which are distributed to the flow detecting valve 31 and the selector valve 50 when the selector valve 50 is shifted to the throttle position, the following formula holds:

$$Qp=Q1+Q2 \tag{9}$$

Also, assuming that the opening area of the variable throttle portion 31*a* of the flow detecting valve 31 is Ap1, as mentioned above, and the opening area of the fixed throttle of the selector valve 50 is Ap2, the flow rates Q1, Q2 of the hydraulic fluid passing through the flow detecting valve 31 and the selector valve 50 are expressed by the following formulae:

$$\begin{aligned}Q1 &= cAp1\sqrt{}((2/\rho)\Delta Pp) \\ &= ca\sqrt{}(2/\rho)\cdot\Delta Pp \\ Q2 &= cAp2\sqrt{}((2/\rho)\Delta Pp)\end{aligned} \tag{10}$$

Here, putting α=ca√(2/ρ) and β=cAp2√(2/ρ) in the above formulae results in:

$$Q1=\alpha\cdot\Delta Pp$$

$$Q2=\beta\cdot\sqrt{}(\Delta Pp) \tag{11}$$

Accordingly, the delivery rate Qp of the fixed displacement hydraulic pump 30 or the revolution speed N of the engine 1 is correlated to the differential pressure ΔPp across the variable throttle portion 31*a* by the following formula:

$$\begin{aligned}Qp &= CmN = Q1 + Q2 \\ &= \alpha\cdot\Delta Pp + \beta\cdot\sqrt{}(\Delta Pp)\end{aligned} \tag{12}$$

From the formula (12), the function of the differential pressure ΔPp with respect to the delivery rate Qp of the hydraulic pump 30 is determined as a downwardly-convex and differentiable continuous function, as indicated by a broken line in FIG. 2A. Thus, the differential pressure ΔPp or PLSref is smaller than that resulting when the selector valve 50 is in the fully closed position, and it increases with respect to the delivery rate Qp of the hydraulic pump 30 or the revolution speed N of the engine 1, as indicated by the broken line in FIG. 2A.

Further, similarly to the formula (7), the relationship between the flow rate Qv demanded by the flow control valve 6*a* and the revolution speed N of the engine 1 can be determined from the formulae (6) and (12). Thus, as a result of the combination of the relationship between N or Qp and ΔPLSref or ΔPp, indicated by the broken line in FIG. 2A, and the relationship represented by the upwardly-convex parabolic curve between ΔPLS (=ΔPLSref) and Qv, shown in FIG. 2B, the demanded flow rate Qv is represented by a curve indicated by the broken line in FIG. 2C.

In other words, the demanded flow rate Qv increases with respect to the revolution speed N of the engine 1, as indicated by the solid line in FIG. 2C. Even at the same revolution speed N of the engine 1 as that resulting when the selector valve 50 is in the fully closed position, therefore, the demanded flow rate Qv is reduced and the speed of the actuator 3*a* is slowed down.

The advantages of this embodiment will be described below.

With the provision of the flow detecting valve 31, as described above, it is possible to reduce the target differential pressure ΔPLSref and to slow down the actuator speed depending on the engine revolution speed. In the case of carrying out both excavation-and-loading work and crane work by one hydraulic excavator, however, the swing speed (rotating speed of the swing motor 3*c*) is changed over a large width. Such a large change width of the speed demanded by the actuator cannot be covered only with an adjustment of the engine revolution speed through the flow detecting valve. That point is now described in more detail.

It is assumed, as one practical example, that the demanded swing speed is 9 $min^{-1}$ in the excavation-and-loading work and is 1 $min^{-1}$ (1/9 time) in the crane work, and the adjustable range of the revolution speed of the engine 1 is 1000 to 2500 $min^{-1}$ (2.5 times).

<Without Selector Valve 50>

This case corresponds to the prior art disclosed in JP,A 10-196604. With the selector valve 50 not included, as described above in connection with the case where the selector valve 50 is in the fully closed position, the relationship of the above formula (5) holds between the target differential pressure ΔPLSref and the engine revolution speed N:

$$\Delta PLSref \propto \Delta Pp \propto N \tag{5}$$

On the other hand, the relationship between the actuator demanded flow rate Qv and the engine revolution speed N is expressed by the above formula (8):

$$Qv \propto N^{1/2} \tag{8}$$

From trial calculation based on the formula (8), when the engine revolution speed varies from 1000 to 2500 $min^{-1}$, the swing speed varies over the range of 5.7 to 9 $min^{-1}$. Hence, this case is not adaptable for 1 $min^{-1}$ required in the crane work.

<Flow Detecting Valve Being Fixed Throttle>

This case corresponds to the prior art disclosed in JP,A 5-99126. Since the flow detecting valve is a fixed throttle, the relationship expressed by the following formula holds between the target differential pressure ΔPLSref and the engine revolution speed N:

$$\begin{aligned} \Delta PLSref &\propto Qp^2 \\ &\propto N^2 \end{aligned} \tag{13}$$

On the other hand, since the relationship between the target LS differential pressure ΔPLSref and the actuator demanded flow rate Qv is expressed by the above formula (6), the relationship between the demanded flow rate Qv and the engine revolution speed N is expressed as follows:

$$Qv \propto N \tag{14}$$

From trial calculation based on the formula (14), when the engine revolution speed varies from 1000 to 2500 $min^{-1}$, the swing speed varies over the range of 3.6 to 9 $min^{-1}$. Hence, this case is also not adaptable for the above required swing speed of 1 $min^{-1}$.

<Present Invention>

With the first embodiment of the present invention, the maximum actuator speed (maximum swing speed) can be reduced from 9 $min^{-1}$ to 1 $min^{-1}$ (1/9) by shifting the selector valve 50 to the throttle position. This point is verified as follows.

When the selector valve 50 is in the throttle position, the relationship between the delivery rate Qp of the fixed displacement hydraulic pump 30 or the revolution speed N of the engine 1 and the differential pressure ΔPp across the variable throttle portion 31*a* is expressed by the above formula (12):

$$\begin{aligned} Qp = CmN &= Q1 + Q2 \\ &= \alpha \cdot \Delta Pp + \beta \cdot \sqrt{(\Delta Pp)} \end{aligned} \tag{12}$$

Assuming here that the differential pressure across the flow detecting valve 31 is ΔPP0 when the selector valve 50 is in the fully closed position, and it is ΔPP1 when the selector valve 50 is in the throttle position, the relationships between the delivery rate Qp of the hydraulic pump 30 and the differential pressures ΔPP0, ΔPP1 are expressed as given below:

$$Qp = \alpha \cdot \Delta PP0$$

$$Qp = \alpha \cdot \Delta PP1 + \beta \cdot \sqrt{(\Delta PP1)}$$

Since the total flow rate (delivery flow rate of the hydraulic pump 30) Qp is not changed between before and after the shift of the selector valve 50, the following formula holds:

$$\alpha \cdot \Delta PP0 = \alpha \cdot \Delta PP1 + \beta \cdot \sqrt{(\Delta PP1)} \tag{15}$$

In order to reduce the maximum actuator speed (maximum swing speed) down to 1/9, the differential pressure across the flow detecting valve 31 resulting when the selector valve 50 is in the throttle position must be $(1/9)^{1/2}$ of that resulting when the selector valve 50 is in the fully closed position; that is:

$$\Delta PP1 = (1/81)\Delta PP0 \tag{16}$$

Putting the formula (16) in (15) leads to:

$$\alpha \cdot \Delta PP0 = (1/81)\alpha \cdot \Delta PP0 + (1/9)\beta \cdot \sqrt{(\Delta PP0)} \tag{17}$$

Solving the formula (17) for β, the following formula is resulted:

$$\beta = (80/9)\alpha\sqrt{\Delta PP0} \tag{18}$$

Thus, once the constant α regarding the flow detecting valve 31 and the differential pressure ΔPP0 across the flow detecting valve 31 resulting when the selector valve 50 is in the fully closed position are both decided, β can be calculated. Consequently, the maximum actuator speed (maximum swing speed) can be reduced down from 9 $min^{-1}$ to 1 $min^{-1}$ (1/9).

Figure 3:
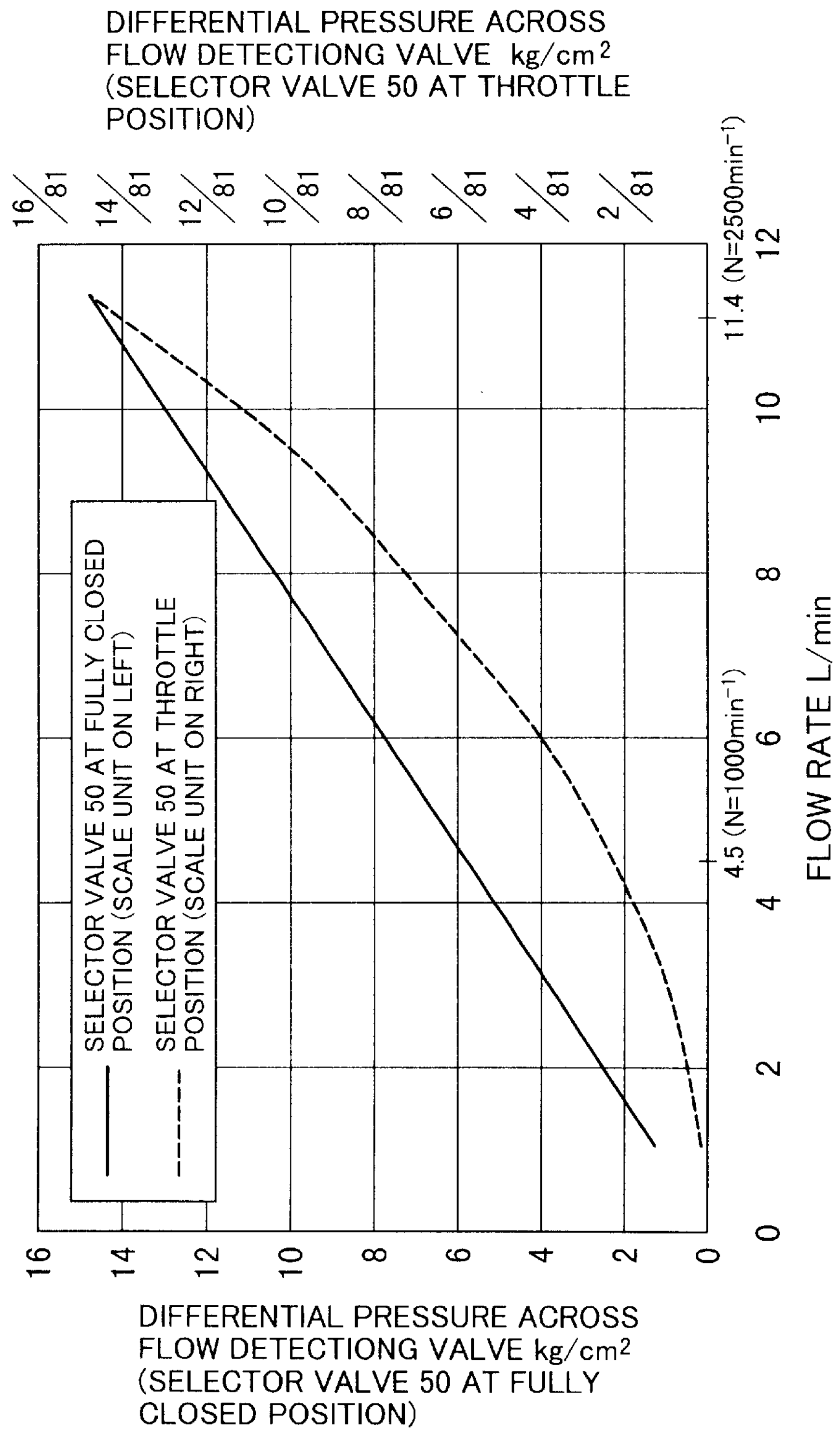
FIG. 3 is a graph showing one example of results calculated for a delivery rate of a fixed displacement hydraulic pump and a differential pressure across the flow detecting valve when the selector valve in the first embodiment is in a fully closed position and when it is in a throttle position.

FIG. 3 shows one example of calculation results. In a graph of FIG. 3, the horizontal axis represents the delivery rate of the hydraulic pump 30 (in proportion to the engine revolution speed), whereas the vertical axis on the left side in the drawing represents the differential pressure across the flow detecting valve 31 resulting when the selector valve 50 is in the fully closed position (when the selector valve 50 is not provided), and the vertical axis on the right side in the drawing represents the differential pressure across the flow detecting valve 31 resulting when the selector valve 50 is in the throttle position. A value of about 4.5 L/min of the delivery rate of the hydraulic pump 30 corresponds to the engine revolution speed of 1000 $min^{-1}$, and a value of about 11.4 L/min thereof corresponds to the engine revolution speed of 2500 $min^{-1}$. Also, the scale unit on the right side in the drawing, which represents the differential pressure across the flow detecting valve 31 resulting when the selector valve 50 is in the throttle position, is magnified as much as 81 times the scale unit on the left side in the drawing, which represents the differential pressure across the flow detecting valve 31 resulting when the selector valve 50 is in the fully closed position.

As seen from FIG. 3, upon the selector valve 50 being shifted from the fully closed position to the throttle position, the differential pressure across the flow detecting valve 31 resulting when the engine revolution speed is 2500 $min^{-1}$ is reduced from 15 $kgf/cm^{2}$ *to* 1/81 thereof, and the actuator demanded flow rate, i.e., the actuator speed, can be reduced down to 1/9.

According to this embodiment, as described above, since the selector valve 50 is provided in parallel to the flow detecting valve 31, the target differential pressure ΔPLSref in the load sensing control can be changed depending on the revolution speed of the engine 1. Also, even when a change width of the demanded actuator speed exceeds the range adjustable with the revolution speed of the engine 1, it is possible to adapt for such a large change width, to realize respective demanded actuator speeds, and to achieve good operability.

Further, when the selector valve 50 is in the fully closed position, the actuator speed can be adjusted in the same manner as that conventionally performed, by adjusting the engine revolution speed as practiced so far. Therefore, an operator can be kept from feeling somewhat different from the operation of a conventional system in setting the engine revolution speed for adjustment of the actuator speed.

In addition, according to this embodiment, the flow detecting valve 31 including the variable throttle portion 31*a*, which can change its opening area depending on the differential pressure across itself, is disposed as throttle means that is positioned in the delivery line of the fixed displacement hydraulic pump 30. As with the invention disclosed in JP,A 10-196604, therefore, it is possible to achieve good fine operability when the engine revolution speed is set to a low value, and to realize a powerful operation feeling with a good response when the engine revolution speed is set to a high value.

Figure 4:
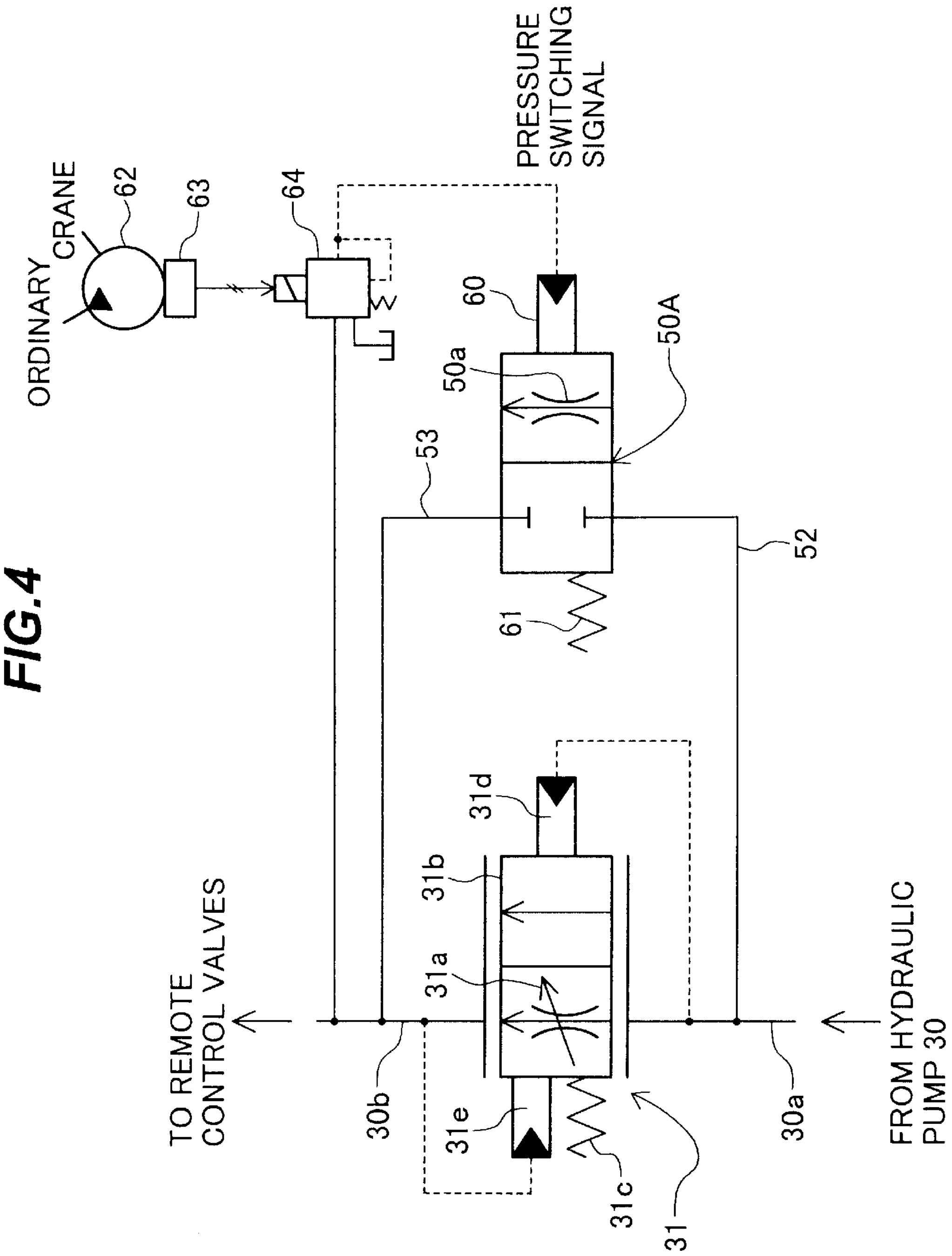
FIG. 4 is a diagram showing a principal part of a pump displacement control unit in a hydraulic drive system according to a second embodiment of the present invention.
Figure 5:
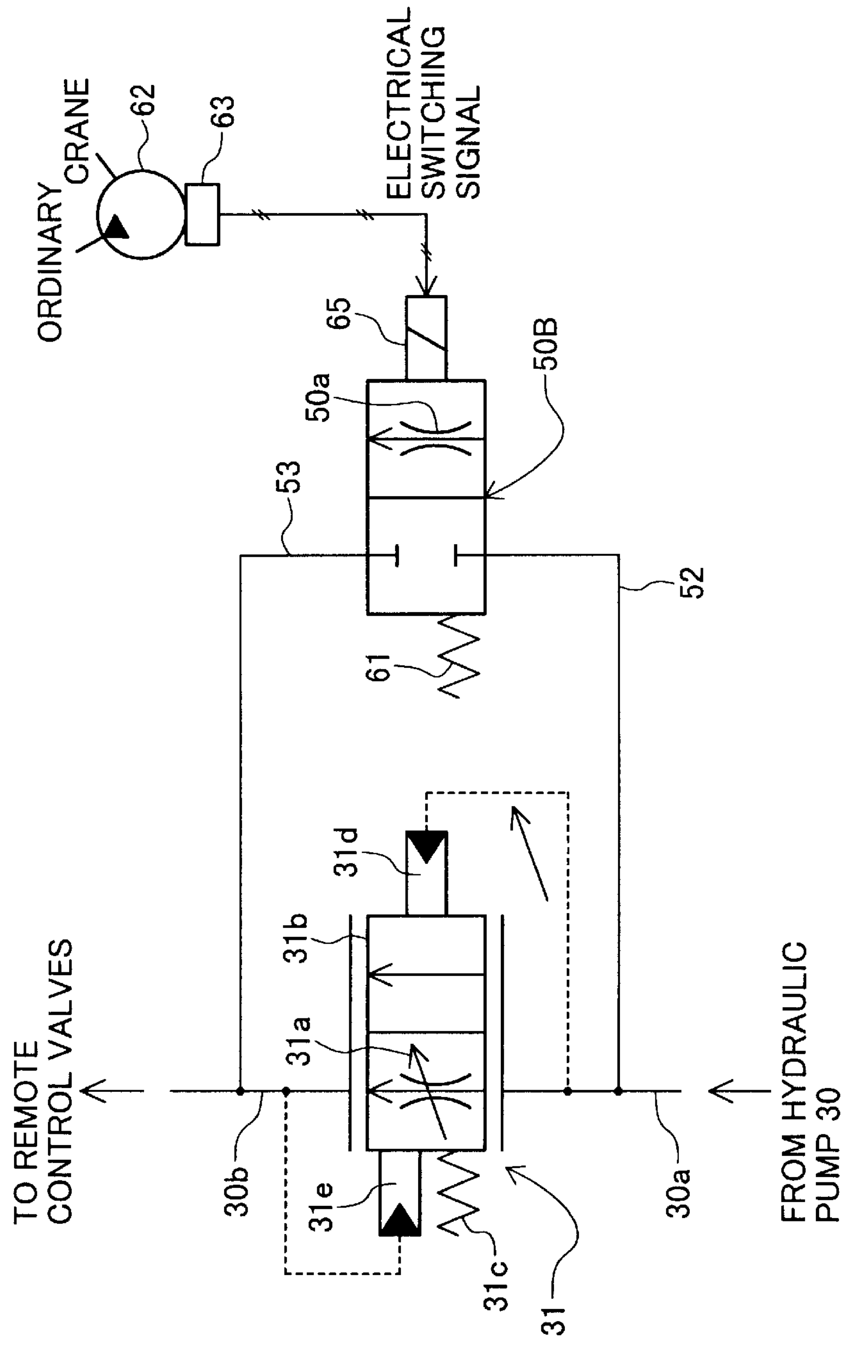
FIG. 5 is a diagram showing a principal part of a pump displacement control unit in a hydraulic drive system according to a third embodiment of the present invention.

Second and third embodiments of the present invention will be described with reference to FIGS. 4 and 5. In these embodiments, the selector valve is shifted in different ways. In FIGS. 4 and 5, identical members to those in FIG. 1 are denoted by the same characters.

In FIG. 4, a pump displacement control unit in the second embodiment of the present invention includes a selector valve 50A that is shifted by hydraulic switching means. A hydraulic driving sector 60 is provided on the side urging the selector valve 50A to the throttle position, and a spring 61 is disposed on the side urging the selector valve 50A to the fully closed position. Further, the pump displacement control unit includes a manual dial 62 operated by an operator to turn between an ordinary work mode position and a crane work mode position, thereby indicating which one of the ordinary work mode and the crane work mode is to be selected; a signal generator 63 for outputting an electrical signal when the manual dial 62 is in the crane work mode position; and a solenoid switching valve 64 operated by the electrical signal supplied from the signal generator 63. A primary port of the solenoid switching valve 64 is connected to the delivery line 30*b* of the fixed displacement hydraulic pump 30, and a secondary port thereof is connected to the hydraulic driving sector 60 of the selector valve 50A.

When the manual dial 62 is in the ordinary work mode position, the solenoid switching valve 64 is not operated and the selector valve 50A is held in the fully closed position by the spring 61. When the manual dial 62 is turned to the crane work mode position, the signal generator 63 generates an electrical signal, and the solenoid switching valve 64 outputs a hydraulic signal to the hydraulic driving sector 60 of the selector valve 50A by using the hydraulic fluid from the hydraulic pump 30 as a hydraulic source. In response to the hydraulic signal, the selector valve 50A is shifted to the throttle position.

FIG. 5, a pump displacement control unit in the third embodiment of the present invention includes a selector valve 50B that is electrically shifted by solenoid switching means. A solenoid driving sector 65 is provided on the side urging the selector valve 50B to the throttle position, and a spring 61 is disposed on the side urging the selector valve 50B to the fully closed position. Further, an electrical signal from a signal generator 63 is directly applied to the solenoid driving sector 65.

When the manual dial 62 is in the ordinary work mode position, the solenoid driving sector 65 is not operated and the selector valve 50B is held in the fully closed position by the spring 61. When the manual dial 62 is turned to the crane work mode position, the signal generator 63 generates an electrical signal, and the selector valve 50B is shifted to the throttle position by the solenoid driving sector 65.

The second and third embodiments can also provide similar advantages to those obtainable with the first embodiment.

Figure 6:
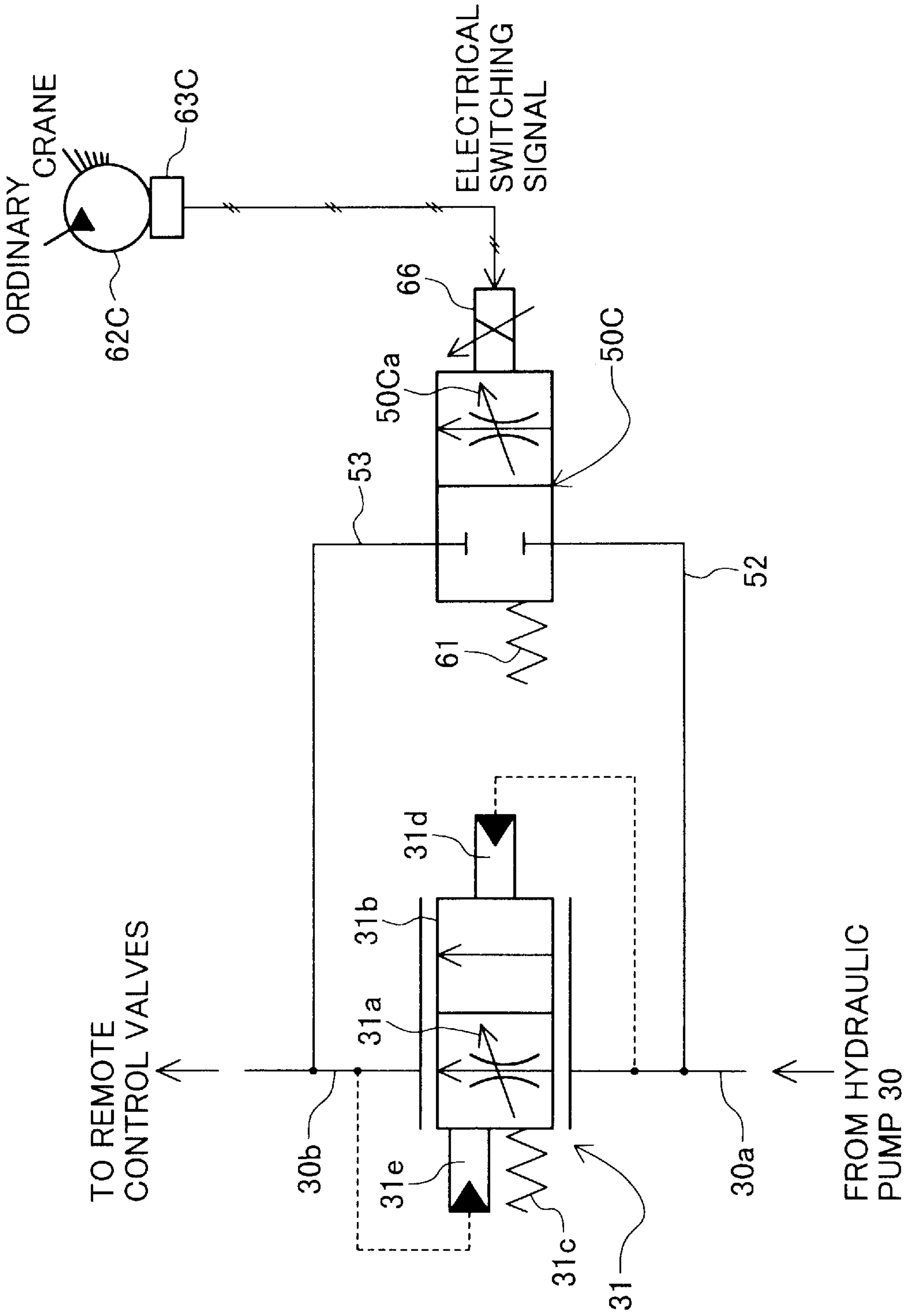
FIG. 6 is a diagram showing a principal part of a pump displacement control unit in a hydraulic drive system according to a fourth embodiment of the present invention.

A fourth embodiment of the present invention will be described with reference to FIG. 6. This embodiment is intended to make the setting adjustable continuously in the crane work mode. In FIG. 6, identical members to those in FIGS. 1, 4 and 5 are denoted by the same characters.

In FIG. 6, a pump displacement control unit in this embodiment includes a selector valve 50C having a throttle portion 50Ca that is constituted as a variable throttle. A proportional solenoid driving sector 66 is provided on the side urging the selector valve 50C to the throttle position, and a spring 61 is disposed on the side urging the selector valve 50C to the fully closed position. Further, the pump displacement control unit includes a manual dial 62C operated by an operator to turn between an ordinary work mode position and a crane work mode position, the manual dial 62C being adjustable continuously when it is in the crane work mode position; and a signal generator 63C for outputting an electrical signal when the manual dial 62C is in the crane work mode position. The electrical signal supplied from the signal generator 63C is applied to the proportional solenoid driving sector 66.

When the manual dial 62C is in the ordinary work mode position, the proportional solenoid driving sector 66 is not operated and the selector valve 50C is held in the fully closed position by the spring 61. When the manual dial 62C is turned to the crane work mode position, the signal generator 63C generates an electrical signal at a level depending on the dial position, and the proportional solenoid driving sector 66 is operated in accordance with the generated electrical signal. Thereby, the selector valve 50C is shifted to the throttle position corresponding to the generated electrical signal, and the throttle portion is 50Ca is adjusted to an opening area corresponding to the position of the manual dial 62C. As a result, when the crane work mode is selected, the actuator speed in the crane work mode can be freely adjusted in accordance with the preference of the operator, and operability can be further improved.

Figure 7:
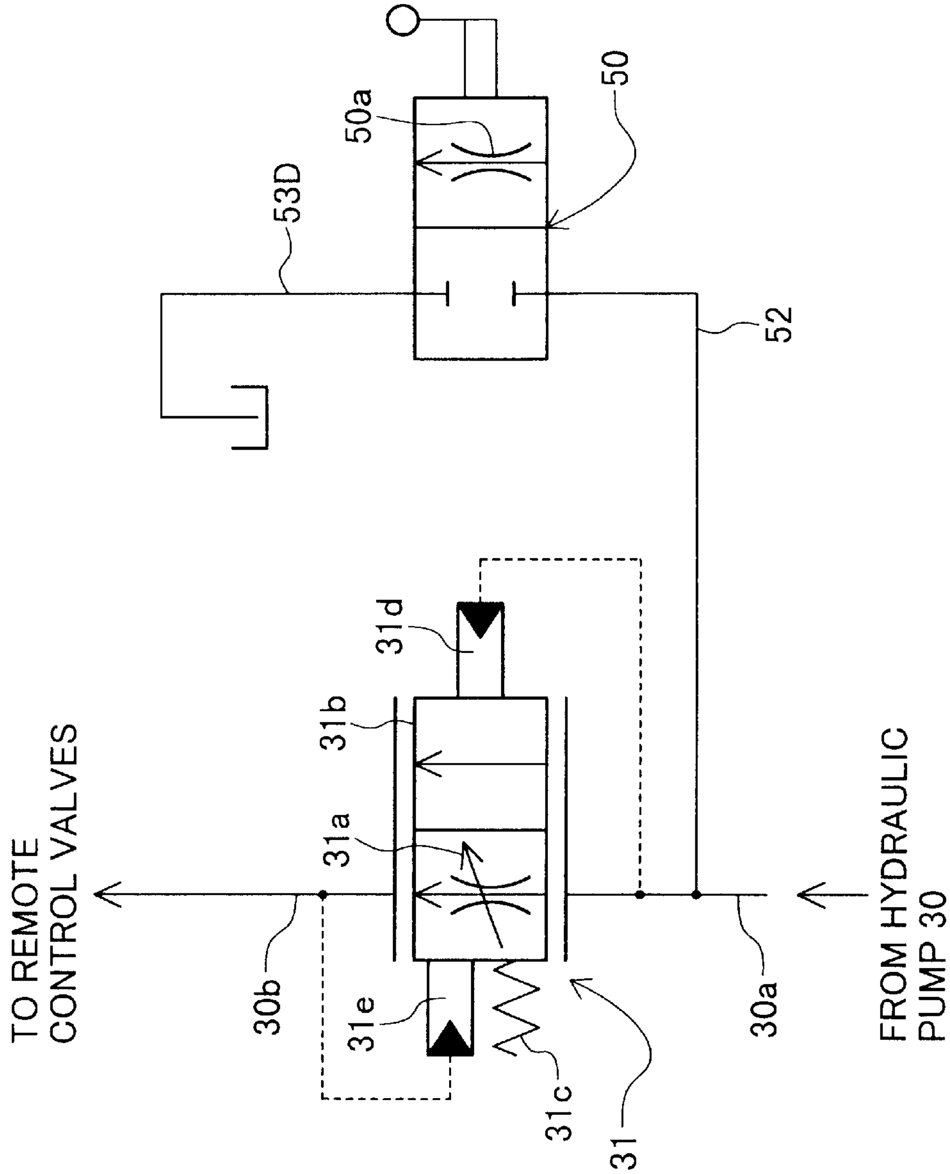
FIG. 7 is a diagram showing a principal part of a pump displacement control unit in a hydraulic drive system according to a fifth embodiment of the present invention.

A fifth embodiment of the present invention will be described with reference to FIG. 7. In this embodiment, the selector valve is connected to the flow detecting valve in parallel in a way different from that in the above-described embodiments. In FIG. 7, identical members to those in FIG. 1 are denoted by the same characters.

In FIG. 7, a pump displacement control unit in this embodiment includes a selector valve 50 connected to the flow detecting valve 31 in parallel. An input port of the selector valve 50 is connected to a hydraulic line 30*a* on the input port side of the flow detecting valve 31 via a bypass fluid line 52. That point is the same as in the first embodiment. In this embodiment, however, an output port of the selector valve 50 is connected to a reservoir via a bypass fluid line 53D. Even in the case of connecting the bypass fluid line 53D as mentioned above, when the selector valve 50 is shifted to the throttle position, a part of the hydraulic fluid from the hydraulic pump 30 is returned to the reservoir through the throttle portion 50*a* and the bypass fluid line 53D, and the hydraulic fluid from the hydraulic pump 30 is distributed to a parallel throttle circuit constituted by the flow detecting valve 31 and the selector valve 50. Upon the shift of the selector valve 50 to the throttle position, therefore, the flow rate of the hydraulic fluid passing through the flow detecting valve 31 is reduced, and the change in the differential pressure ΔPp across the flow detecting valve 31 (or ΔPLSref) with respect to the delivery rate of the hydraulic pump 30 (in proportion to the engine revolution speed) is given as providing characteristics suitable for the crane work mode.

Accordingly, this fifth embodiment can also provide similar advantages to those obtainable with the first embodiment.

While the embodiments of the present invention have been described above, the present invention is not limited to the above-described embodiments, but can be variously modified and altered within the scope of the spirit of the present invention.

For example, in the above-described embodiments, the pressure compensating valve is of the front-located type that it is disposed upstream of the flow control valve. However, the pressure compensating valve may be of the back-located type that it is disposed downstream of the flow control valve. In this case, output pressures of all flow control valves are controlled to the same maximum load pressure so that the differential pressures across the flow control valves are controlled to the same differential pressure ΔPLS.

Also, in the above-described embodiments, the delivery pressure of the hydraulic pump 2 and the maximum load pressure are directly introduced to the setting controller 23*b* of the pump displacement control unit 5 and the pressure compensating valves 7*a* to 7*c*, and the differential pressure ΔPLS between both the introduced pressures is obtained inside the setting controller 23*b* and each of the pressure compensating valves. However, a differential pressure detecting valve for converting the differential pressure ΔPLS between the delivery pressure of the hydraulic pump 2 and the maximum load pressure to one hydraulic signal may be provided, and the converted hydraulic signal may be introduced to the setting controller 23*b* and the pressure compensating valves 7*a* to 7*c*. That modification is likewise applied to the differential pressure ΔPp across the flow detecting valve 31. Specifically, instead of introducing the pressures upstream and downstream of the flow detecting valve 31 directly to the setting controller 23*b* of the pump displacement control unit 5, a differential pressure detecting valve for converting the differential pressure across the flow detecting valve 31 to one hydraulic signal may be provided, and the converted hydraulic signal may be introduced to the setting controller 23*b*. By using such a differential pressure detecting valve, the number of hydraulic signals to be handled is reduced and the circuit arrangement can be simplified.

Further, while the differential pressure ΔPp across the flow detecting valve 31 is introduced to the setting controller 23*b* of the pump displacement control unit 5 without changing its level, the differential pressure across the flow detecting valve 31 may be introduced after being reduced or increased, for the purpose of facilitating an adjustment of the target differential pressure ΔPLSref in the load sensing control to be set on the side of the pump displacement control unit 5.

Moreover, in the above-described embodiments, the flow detecting valve 31 including the variable throttle portion 31*a*, which can change its opening area depending on the differential pressure across itself, is disposed as throttle means that is positioned in the delivery line of the fixed displacement hydraulic pump 30. However, a fixed throttle may be disposed as with the prior art disclosed in JP,A 5-99126.

Additionally, in the above-described embodiments, detection of the engine revolution speed and change of the target differential pressure based on the detected speed are hydraulically performed. However, that process may be electrically performed, for example, by detecting the engine revolution speed with a sensor and calculating the target differential pressure from a sensor signal.

Industrial Applicability

According to the present invention, since a selector valve is provided in parallel to throttle means, the target differential pressure in load sensing control can be changed depending on the revolution speed of a prime mover. Also, even when a change width of the demanded actuator speed exceeds the range adjustable with the revolution speed of the prime mover, it is possible to adapt for such a large change width, to realize the respective demanded actuator speeds, and to achieve good operability.

Further, when the selector valve is in the fully closed position, the actuator speed can be adjusted in the same manner as that conventionally performed, by adjusting the engine revolution speed as practiced so far. Therefore, an operator can be kept from feeling somewhat different from the operation of a conventional system in setting the revolution speed of the prime mover for adjustment of the actuator speed.

What is claimed is:

1. A hydraulic drive system comprising:

a prime mover (1);

a variable displacement hydraulic pump (2) driven by said prime mover;

a plurality of actuators (3*a*–3*c*) driven by a hydraulic fluid delivered from said hydraulic pump;

a plurality of flow control valves (6*a*–6*c*) for controlling flow rates of the hydraulic fluid supplied from said hydraulic pump to said plurality of actuators;

a plurality of pressure compensating valves (7*a*–7*c*) for controlling differential pressures across said plurality of flow control valves depending on a differential pressure between a delivery rate of said hydraulic pump and a maximum load pressure among said plurality of actuators;

pump displacement control means (5) for controlling a displacement of said hydraulic pump and maintaining the differential pressure between the delivery rate of said hydraulic pump and the maximum load pressure among said plurality of actuators at a setting value; and a fixed displacement hydraulic pump (30) driven by said prime mover along with said variable displacement hydraulic pump;

said pump displacement control means including throttle means (31*a*) provided in a delivery line of said fixed displacement hydraulic pump, detecting change in revolution speed of said prime mover based on change in differential pressure across said throttle means, and changing said setting value depending on the revolution speed of said prime mover;

wherein said hydraulic drive system further comprises a selector valve (50; 50A; 50B; 50C) connected to said throttle means (31*a*) in parallel and being operable to shift between a fully closed position and a throttle position.

2. A hydraulic drive system according to claim 1, further comprising manual operating means (51; 62; 62C) for shifting said selector valve (50; 50A; 50B; 50C) between the fully closed position and the throttle position.

3. A hydraulic drive system according to claim 1, further comprising:

manual operating means (62; 62C) operated by an operator; and switching means (63, 64, 60; 63, 65; 63C, 66) for shifting said selector valve (50A; 50B; 50C) between the fully closed position and the throttle position in response to an operation of said manual operating means.

4. A hydraulic drive system according to claim 3, wherein said switching means (63, 64, 60) are electrically and hydraulically operated.

5. A hydraulic drive system according to claim 3, wherein said switching means (63, 65; 63C, 66) are electrically operated.

6. A hydraulic drive system according to claim 1, wherein said selector valve (50C) is able to change an opening area continuously when said selector valve is in the throttle position.

* * * * *